(12) United States Patent
Butler et al.

(10) Patent No.: US 11,280,412 B2
(45) Date of Patent: Mar. 22, 2022

(54) STEM ANTI-ROTATION DEVICE FOR NUCLEAR REACTOR POWER PLANT GATE VALVES AND MAINTENANCE METHOD USING THE STEM ANTI-ROTATION DEVICE

(71) Applicants: Patrick Butler, Alexandria, VA (US); Paul Knittle, Alexandria, VA (US)

(72) Inventors: Patrick Butler, Alexandria, VA (US); Paul Knittle, Alexandria, VA (US)

(73) Assignee: MPR Associates, Inc., Alexandria, VA (US)

( * ) Notice: Subject to any disclaimer, the term of this patent is extended or adjusted under 35 U.S.C. 154(b) by 0 days.

(21) Appl. No.: 16/741,439

(22) Filed: Jan. 13, 2020

(65) Prior Publication Data

US 2020/0300373 A1 Sep. 24, 2020

Related U.S. Application Data

(60) Provisional application No. 62/792,314, filed on Jan. 14, 2019.

(51) Int. Cl.
*F16K 3/18* (2006.01)
*F16K 31/50* (2006.01)
*G21D 3/04* (2006.01)

(52) U.S. Cl.
CPC ............. *F16K 3/186* (2013.01); *F16K 31/50* (2013.01); *F16K 31/508* (2013.01); *G21D 3/04* (2013.01)

(58) Field of Classification Search
CPC . F16K 3/186; F16K 3/184; F16K 3/18; F16K 31/508; F16K 31/50; F16K 27/044

USPC .................................................. 251/194–196
See application file for complete search history.

(56) References Cited

U.S. PATENT DOCUMENTS

| 119,057 A | * | 9/1871 | Snyder | F16K 3/186 |
| | | | | 251/195 |
| 1,950,307 A | | 6/1932 | Ivins | |
| 2,577,434 A | | 9/1945 | Rosenbaum | |
| 2,747,833 A | * | 5/1956 | Langner | F16K 3/186 |
| | | | | 251/196 |
| 3,743,244 A | * | 7/1973 | Dickenson | F16K 3/186 |
| | | | | 251/197 |
| 4,573,660 A | * | 3/1986 | Husted | F16K 3/186 |
| | | | | 251/195 |
| 5,116,018 A | | 5/1992 | Friemoth et al. | |
| 5,236,172 A | | 8/1993 | Friemoth et al. | |

(Continued)

FOREIGN PATENT DOCUMENTS

| GB | 1085235 A | * | 9/1967 | ............. F16K 31/50 |
| WO | WO-2014016496 A2 | * | 1/2014 | ......... F16K 37/0083 |

OTHER PUBLICATIONS

Flowserve—"Anchor Darling Double Disc Gate Valves" by Flowserve (see at least pp. 2-4) publicly available since 2010. (Year: 2010).*

(Continued)

*Primary Examiner* — David Colon-Morales

(57) ABSTRACT

An anti-rotation device for preventing separation of a valve stem and valve disc(s) in a gate valve in a nuclear reactor power plant of the type where connection means, such as a wedge or disc hub, is threadedly engaged by the valve stem to actuate the valve and a method for maintenance or repair of the valve without disassembly of the valve or removal of the valve actuator.

6 Claims, 8 Drawing Sheets

(56) References Cited

U.S. PATENT DOCUMENTS

| | | | |
|---|---|---|---|
| 5,244,008 A | 9/1993 | Bauer | |
| 5,435,520 A * | 7/1995 | Vyvial | F16K 3/186 |
| | | | 251/196 |
| 5,704,594 A * | 1/1998 | Wurangian | F16K 3/18 |
| | | | 251/195 |
| 5,878,769 A | 3/1999 | Goudreault | |
| 7,117,884 B2 | 10/2006 | Shuter | |
| 7,753,341 B2 * | 7/2010 | Guidi | F16K 31/508 |
| | | | 251/268 |
| 8,413,956 B2 * | 4/2013 | Zingsem | F16K 3/186 |
| | | | 251/197 |

OTHER PUBLICATIONS

Flowserve 2—"Anchor/Darling Double Disc Gate Valves" by Flowserve (see at least p. 1) publicly available since 2014. (Year: 2014).*

* cited by examiner

STEM ANTI-ROTATION DEVICE FOR NUCLEAR REACTOR POWER PLANT GATE VALVES AND MAINTENANCE METHOD USING THE STEM ANTI-ROTATION DEVICE

CROSS-REFERENCE TO RELATED PATENT APPLICATION

This application claims priority from U.S. Provisional Patent Application Ser. No. 62/792,314 filed Jan. 14, 2019, the entire disclosure of which is incorporated herein by reference.

BACKGROUND OF THE INVENTION

Field of the Invention

The present invention pertains to gate valves for nuclear reactor power plants and, more particularly, to an anti-rotation device for preventing connecting means and stem separation in gate valves and a maintenance method for gate valves utilized in nuclear reactor power plants where the valves are activated via a threaded stem arrangement.

Brief Discussion of the Related Art

Gate valves are conventionally utilized in nuclear reactor power plants, particularly double disc gate valves, as exemplified by the Anchor/Darling DDGV valve shown in FIG. 1 and in U.S. Pat. No. 4,573,660 to Husted. Such valves utilize a pair of discs with wedge means operated by an actuator. Problems have occurred with the use of such double disc gate valves, in particular stem-disc separation occurring as a result of shear failure of a wedge pin used with the stem and excessive wear of the valve stem-to-wedge threads. Such failures are frequently referred to as wedge pin failures or anti-rotation pin failures in that when a wedge pin fails stem-disc separation can occur. Wedge pin failures and stem-disc separation events require repair which can be extremely expensive and time-consuming. As shown in FIG. 1, the valve stems on most double disc gate valves are attached to an upper wedge using threads, and a pin is installed through the hub of the upper wedge and stem threaded section to prevent the stem from loosening and eventually unscrewing from the wedge. The disc retainers on some double disc gate valves are attached using the wedge pin. Other valve designs use a similar threaded stem-to-wedge or hub connection. The output torque of an actuator for the valve is transmitted to the stem/wedge joint through the stem. The wedge pin is not designed to withstand the full actuator output torque which tends to tighten the stem into the wedge during closing and tends to loosen the stem during opening. Thus, there are concerns relating to wedge pin failure particularly relating to unthreading during valve opening and with degradation and wear of threads due to relative motion between the stem and wedge connection.

SUMMARY OF THE INVENTION

One aspect of the present invention is the prevention of failure of threaded and pinned stem-to-wedge joints in gate valves with stem-to-disc connections in nuclear reactor power plants without internal repair or maintenance of the valves.

In another basic aspect, the present invention uses a valve stem anti-rotation device formed of an extension bolted to the stem of the valve via a threaded hole machined into the top of the stem, a housing mounted on the valve actuator and an anti-rotation assembly disposed between the extension and the housing. Accordingly, disassembly of neither the valve nor the actuator is required in accordance with the present invention. Installation of the anti-rotation device of the present invention is accomplished at the valve in situ leaving the wedge pin in place and without requiring removal of the actuator or disassembly of the valve.

Some of the advantages of the present invention include ease of installation since the anti-rotation device requires only access to the top of the valve stem and the actuator to the extent that the anti-rotation housing is secured to the actuator, the anti-rotation device can be used with various gate valves including double disc valves and other disc-type valves with similar stem-to-disc connections. The dimensions of the components can be sized to limit peak stresses for maximum applied torque, installation of the anti-rotation device does not require internal valve work and can be installed without actuator removal or disassembly since the device mounts on the existing actuator, the device and method require minimal in-field machining, namely machining operations on the valve stem, the device maximizes rethreading prior to installation due to the application of actuator re-torque, the anti-rotation device minimizes and/or eliminates loads applied to the stem-to-wedge threaded joint thereby potentially eliminating the weak link in existing systems and increasing torque margins and the anti-rotation device has minimal impact to existing valve analyses due to insignificant increase in valve/actuator weight.

The present invention is briefly characterized in an anti-rotation device for preventing separation of a valve stem and valve discs in a gate valve of the type having an actuator for controlling the valve, connection means, such as wedge and disc hub means, threadedly engaged by the valve stem to control the position of the valve disc(s) including an extension secured in a hole machined into the top of the valve stem, an anti-rotation housing secured to the actuator and carrying an anti-rotation abutment structure and an anti-rotation coupling carried by the extension and having a shape mating with the abutment structure to prevent rotation of the valve stem. Further, the present invention is characterized in a maintenance method for a gate valve of the type used in nuclear reactor power plants where the gate valve includes an actuator and is actuated via a threaded stem connection, the method including the steps of machining a hole in the top of the valve stem, connecting an extension to the stem using the machined hole, bolting an anti-rotation housing to the actuator with the housing having an anti-rotation abutment, clamping an anti-rotation coupling onto the extension, and positioning the coupling in the housing to mate with the abutment structure whereby rotation of the valve stem and application of torque to the stem/wedge connection is prevented.

Other aspects and advantages of the present invention will become apparent from the following description of the invention taken in conjunction with the accompanying drawings wherein like parts in each of the figures are identified by the same reference characters.

DETAILED DESCRIPTION OF THE INVENTION

Figure 1:
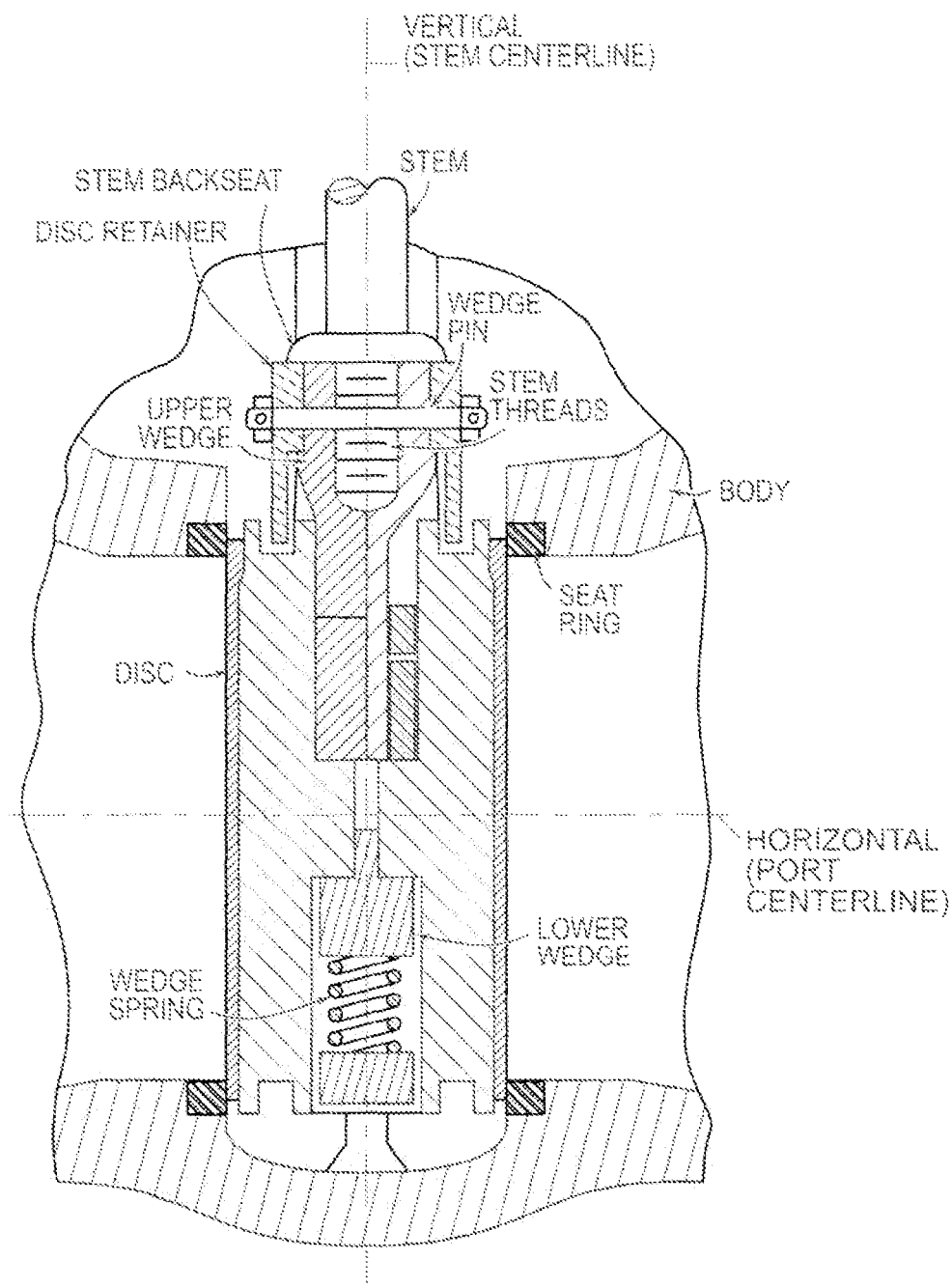
FIG. 1 is a broken sectional view of a conventional double disc gate valve.
Figure 2:
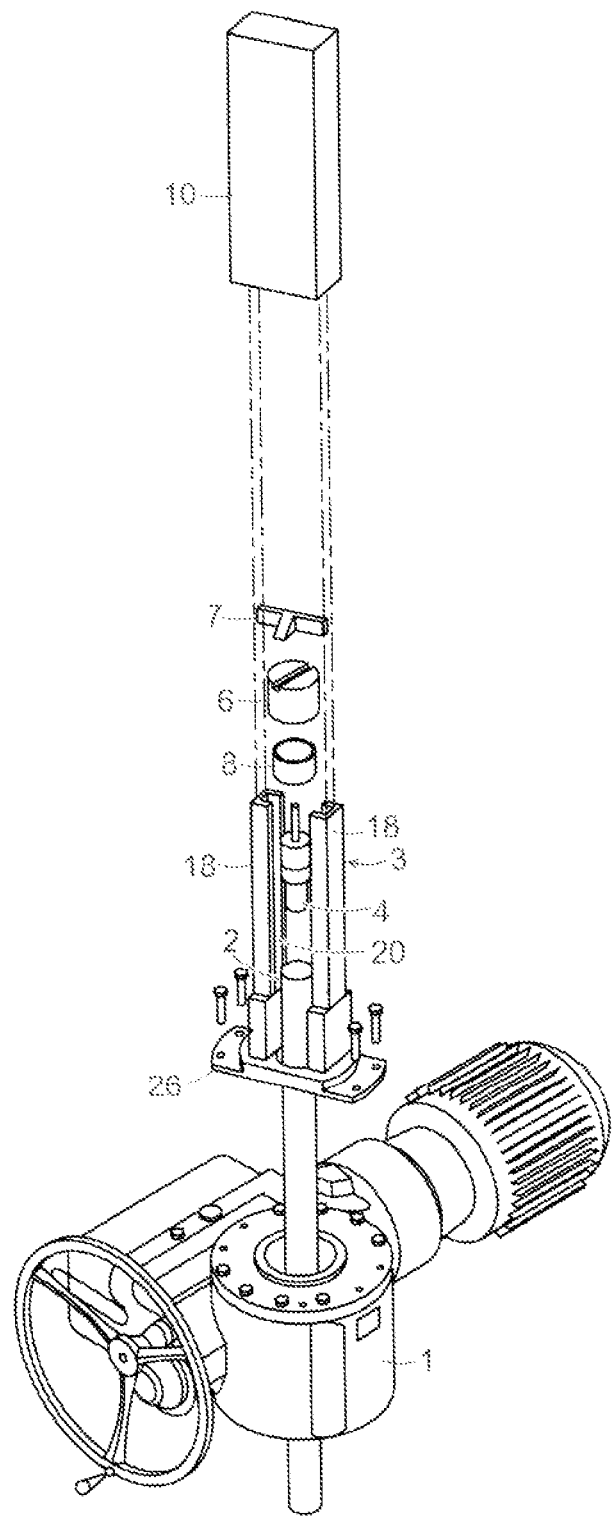
FIG. 2 is an exploded view of an anti-rotation device according to the present invention.
Figure 3:
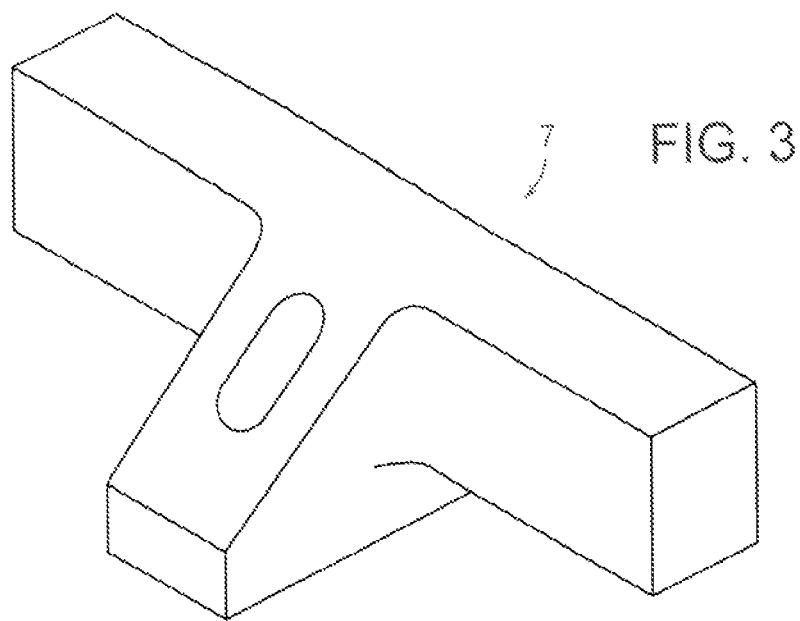
FIG. 3 is a perspective view of the anti-rotation bar of the anti-rotation device of the present invention.
Figure 4:
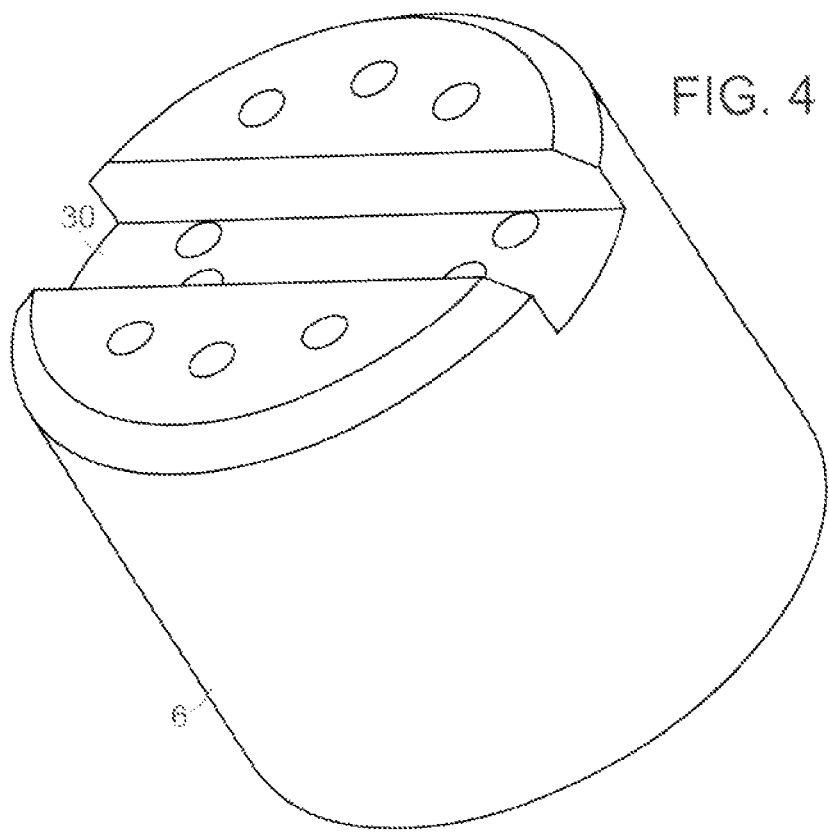
FIG. 4 is a perspective view of the anti-rotation cup of the anti-rotation device of the present invention.
Figure 5:
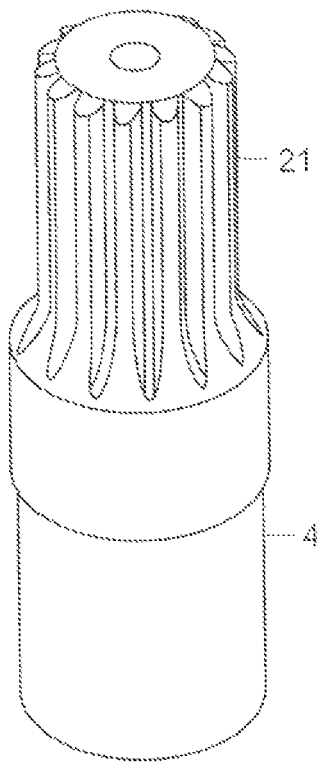
FIG. 5 is a perspective view of the stem extension of the anti-rotation device of the present invention.
Figure 6:
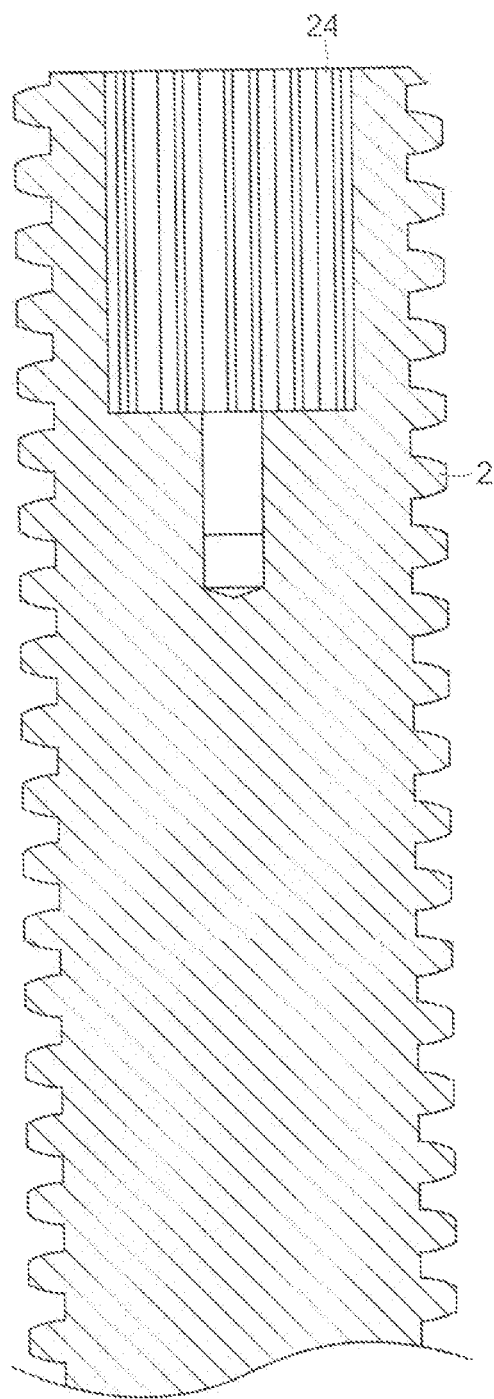
FIG. 6 is a sectional view of the top of the valve stem machined to be coupled with the stem extension.
Figure 7:
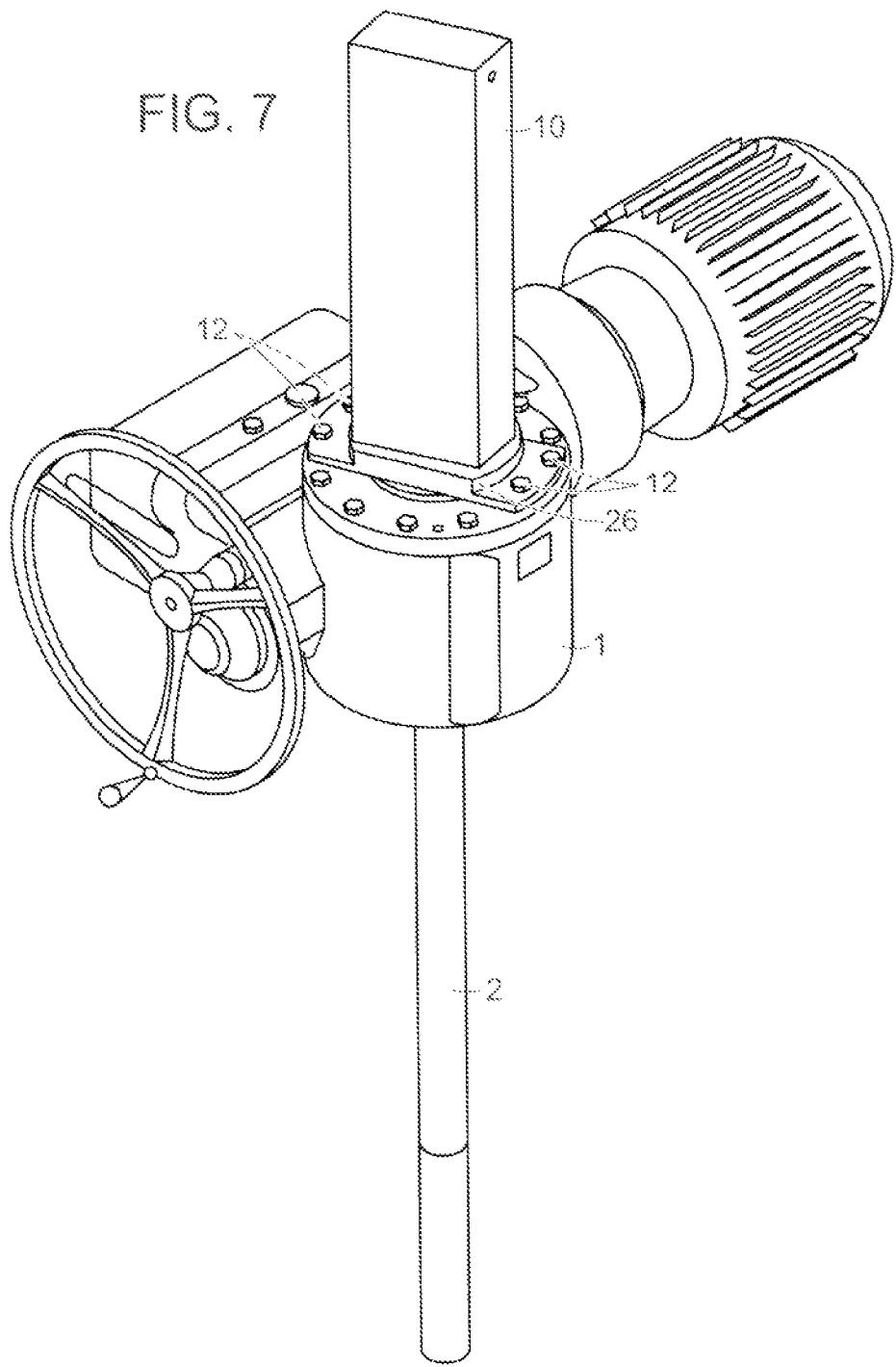
FIG. 7 is a perspective view of the anti-rotation device of the present invention assembled with the actuator and the valve stem.
Figure 9:
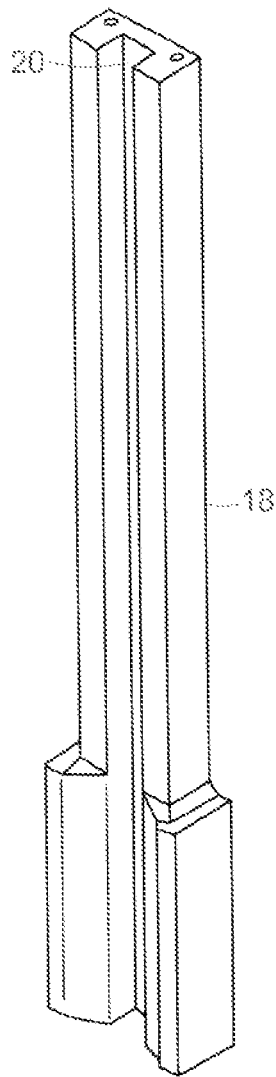
FIG. 9 is a perspective view of a rail forming an abutment structure for the anti-rotation housing of the present invention.
Figure 10:
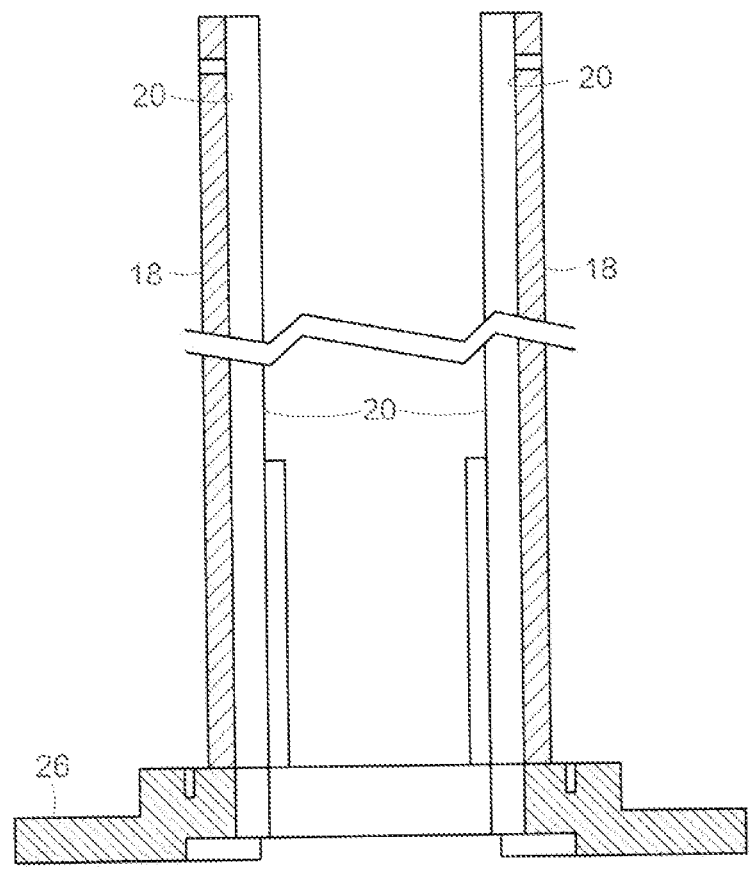
FIG. 10 is a sectional view of the side and bottom plates of the anti-rotation housing.

A conventional double disc gate valve is shown in FIG. 1 with the components labeled. The anti-rotation device according to the present invention is shown in FIG. 2 for use with the double disc gate valve as well as with other gate valves with similar stem-to-disc connections (not shown). The valve stem of the gate valve is shown at 2. A conventional actuator is shown at 1 for operating the valve stem. The top end of the valve stem is shown in FIG. 6 after machining to permit the formation of a splined joint with splines 21 on a stem extension 4, shown in FIG. 5, adapted to be received by splines 24 machined in the top of the valve stem shown in FIG. 6. The extension 4 is disposed within a stem cover 10 of the anti-rotation housing assembly 3. Within the housing assembly 3 is an abutment structure formed of spaced longitudinal rails 18 having channels 20 shown in FIGS. 9 and 10 for receiving an anti-rotation bar 7 shown in FIG. 3. The anti-rotation bar has a shape mating with the channel shape of the abutment structure in the anti-rotation housing such that the ends of the bar are slidably received in the channels 20 in the rails 18 shown in FIG. 8. An anti-rotation cup 6 has a slot shape 30 as shown in FIG. 4 to mount the anti-rotation bar 7 to assure alignment with the rails 18 which extend from a bottom plate 26 formed in the anti-rotation housing assembly as shown in FIG. 10. The cover 10 is provided to cover the top of the stem 2 and the anti-rotation components above the actuator 1, and bottom plate 26, as shown in FIG. 7 is mounted on actuator 1 via bolts.

Figure 8:
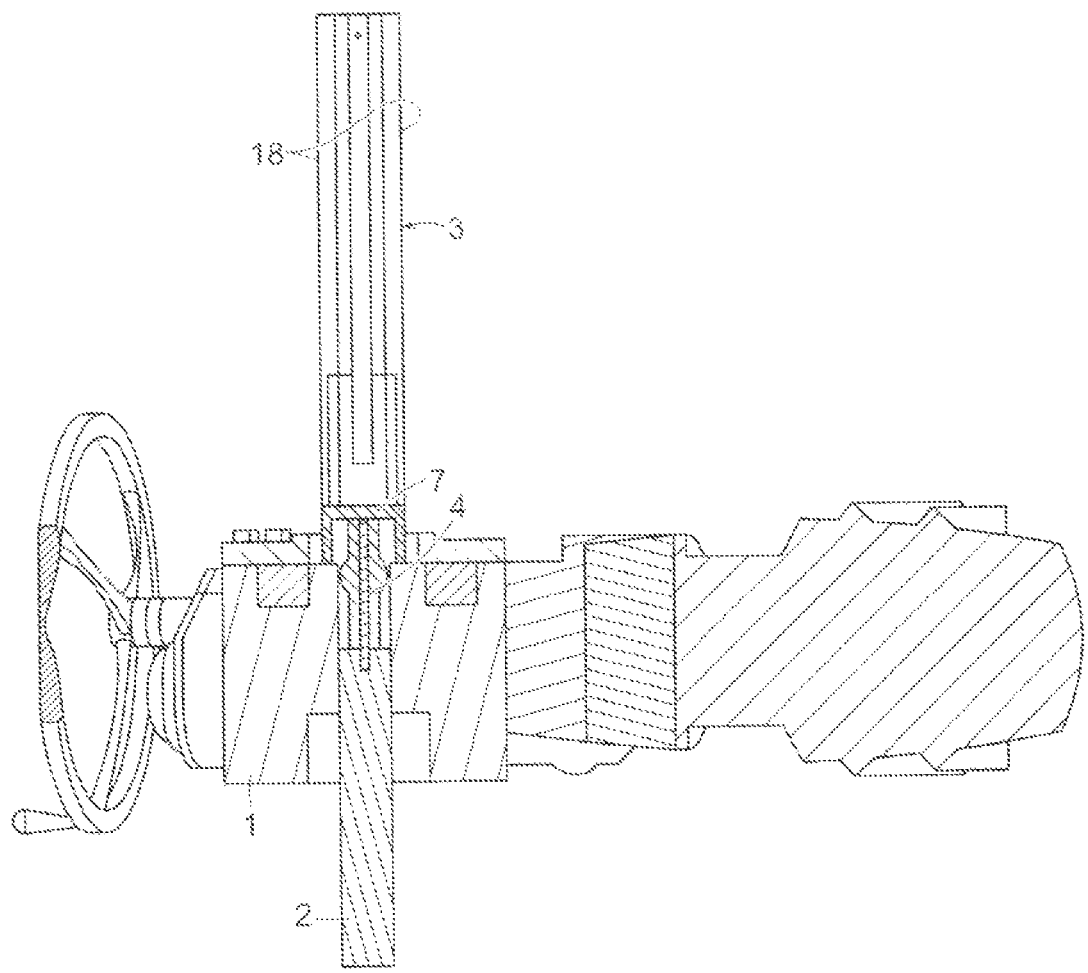
FIG. 8 is a broken, sectional view of the anti-rotation device mounted on an actuator and coupled with the valve stem.
Figure 11:
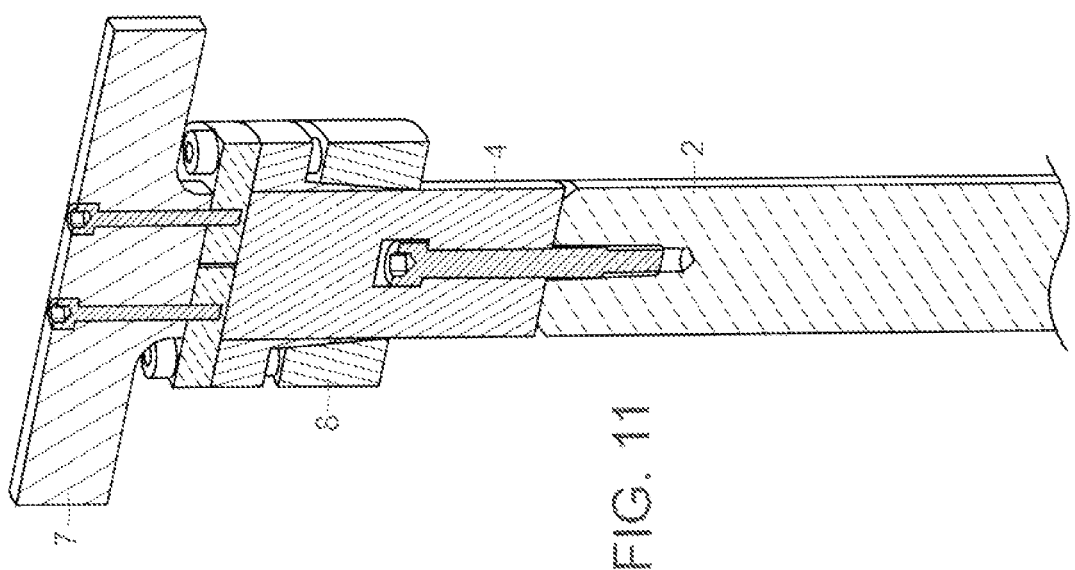
FIG. 11 is a broken view of the anti-rotation coupling secured to the valve stem.

To install the anti-rotation device, the valve is opened, and the top of the valve stem is machined, normally using electrical discharge machining (EDM). After machining, the stem extension 4 is attached in any suitable fashion, for example using a central bolt as shown in FIGS. 8 and 11. After the stem extension 4 is secured, the anti-rotation housing assembly 3 is mounted on the actuator 1 and the valve is closed to seat the joint.

Figure 12:
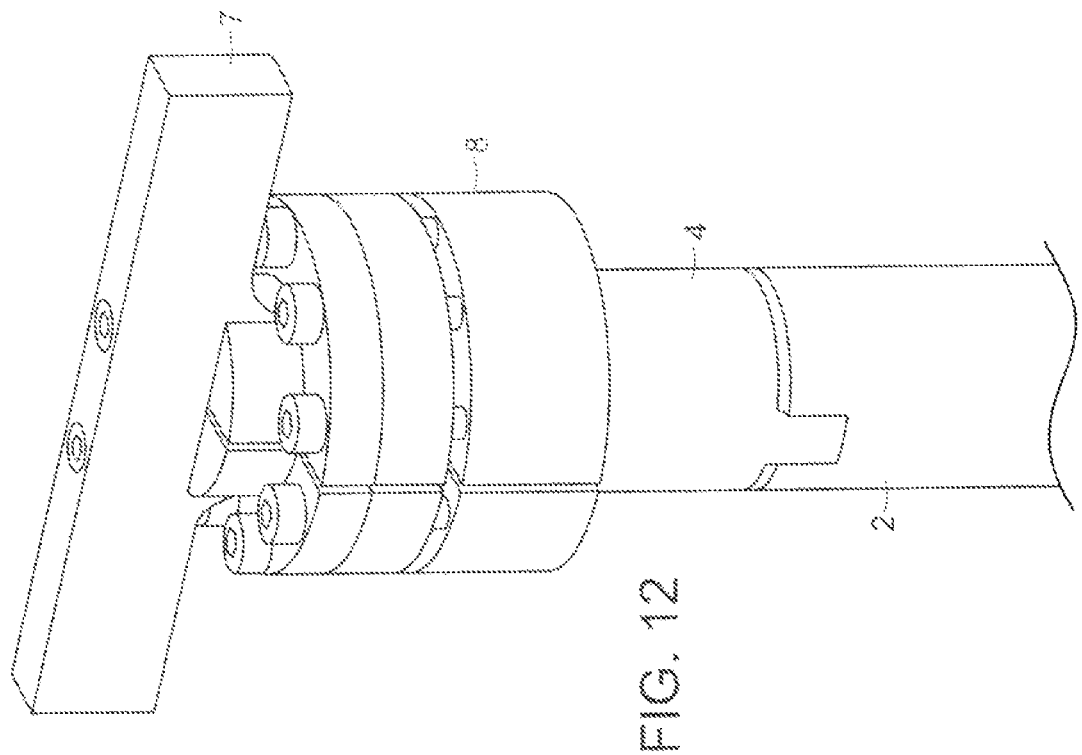
FIG. 12 is a perspective view of the anti-rotation coupling secured to the valve stem.

The anti-rotation cup 6 with clamping feature 8 is then attached to the stem extension 4 with bolts 12 as shown in FIGS. 11 and 12 and via the cup 6 which assures proper alignment. Since the stem extension mates with the anti-rotation housing and the abutment structure therein, rotation of the stem is prevented and application of torque to the stem-to-upper wedge is prevented. As previously noted, the anti-rotation device is installed without disassembly of the gate valve and without actuator removal or disassembly. Since valve stems are not necessarily centered within the actuator housing and are not necessarily straight, the anti-rotation bar 7 floats within slot 30 in the cup 6. The anti-rotation device accommodates any non-concentricity for misalignment between the valve stem and the actuator/guide rails. The installation process assures that the stem-to-wedge threaded joint is optimally seated and maintained during subsequent open/close cycles. The design and arrangement of components minimizes or eliminates torque loads on the stem-to-wedge threaded joint and moves the weak link away from the stem-to-wedge pin to increase torque margins. Accordingly, installation of the anti-rotation device according to the present invention involves minimal added hardware and has minimal impact on existing valve/actuator qualification.

Use of the anti-rotation device of the present invention thus provides a maintenance method for double disc gate valves and other valves with similar stem-to-disc connections utilized in nuclear reactor power plants, the method including the steps of machining a hole in the top of the valve stem, connecting a stem extension to the stem using the machined hole, bolting an anti-rotation housing to the actuator with the housing having an anti-rotation abutment structure therein, clamping an anti-rotation coupling onto the stem extension and positioning the coupling in the housing to mate with the abutment structure whereby rotation of the valve stem and application of torque to the stem-to-wedge connection is prevented.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. An anti-rotation device for installation on a gate valve in situ in a nuclear reactor power plant to prevent separation of a valve stem having a top and valve disc(s) in the gate valve which includes an actuator for controlling the valve and a connection means threadedly engaged by the valve stem to actuate the valve comprising an extension secured in a hole machined into the top of the valve stem;

an anti-rotation housing secured to the actuator and carrying an anti-rotation abutment structure; and an anti-rotation coupling carried by the extension and having a shape mating with said abutment structure to prevent rotation of the valve stem;

said anti-rotation coupling including a transversely extending anti-rotation bar, said abutment structure including spaced rails defining longitudinal channels slidably receiving said anti-rotation bar and said extension carrying an anti-rotation cup having a slot shape to mount said anti-rotation bar to assure alignment of said anti-rotation bar with said spaced rails.

2. An anti-rotation device as recited in claim 1 wherein said extension is secured to the valve stem using a splined joint.

3. A maintenance method for a gate valve utilized in a nuclear reactor power plant where the gate valve includes an actuator and is actuated via a threaded stem connection comprising the steps of machining a hole in a top of the stem;

connecting an extension to the stem using the machined hole;

bolting an anti-rotation housing to the actuator, the housing having an anti-rotation abutment structure;

clamping an anti-rotation coupling onto the extension; and positioning the coupling in the housing to mate with the abutment structure whereby rotation of the stem and application of torque to the stem connection is prevented.

4. A maintenance method for a gate valve as recited in claim 3 wherein disassembly of the valve is not required.

5. A maintenance method for a gate valve as recited in claim 4 wherein the actuator is not required to be removed or disassembled.

6. A maintenance method for a gate valve as recited in claim 3 wherein the valve is a double disc gate valve and the stem connection is a wedge.

* * * * *